United States Patent [19]

Evans

[11] Patent Number: 5,040,815
[45] Date of Patent: Aug. 20, 1991

[54] TRACTOR-TRAILER CONNECTION FOR UNEVEN TERRAIN TRAVEL

[75] Inventor: Roger W. Evans, Sun City West, Ariz.

[73] Assignee: Government of the United States as represented by the Secretary of the Air Force, Washington, D.C.

[21] Appl. No.: 296,261

[22] Filed: Jan. 12, 1989

[51] Int. Cl.⁵ .......................................... B62D 53/08
[52] U.S. Cl. .............................. 280/425.2; 280/441.2; 414/481
[58] Field of Search ............... 280/425.2, 441.2, 417.1, 280/511, 423.1; 414/458, 480, 481

[56] References Cited

U.S. PATENT DOCUMENTS

| | | | |
|---|---|---|---|
| 3,380,758 | 4/1968 | Granning | 280/425 |
| 3,632,139 | 1/1972 | Stafford, Jr. | 280/425 A |
| 3,698,582 | 10/1972 | Weinmann | 214/506 |
| 3,955,831 | 5/1976 | Whitechurch | 280/423.1 |
| 4,183,548 | 1/1980 | Schneckloth | 280/423.1 |
| 4,618,307 | 10/1986 | Kress et al. | 414/498 |
| 4,728,114 | 3/1988 | Bills | 280/425.2 |

Primary Examiner—Mitchell J. Hill
Attorney, Agent, or Firm—Robert L. Nathans; Donald J. Singer

[57] ABSTRACT

A gooseneck structure is coupled to a tractor via a spherical bearing which compensates for pitch, roll and yaw motions and is coupled to support brackets upon the trailer via a horizontal support beam positioned at the underside of the support brackets. Air bag lifting actuators cause the horizontal support beam to be raised to contact the support brackets mounted upon a side wall portion of the trailer and a hydraulic actuator thereafter causes a substantially vertical elevation control beam to press against a side wall portion of the trailer to rotate the trailer about its wheel axles and thus elevate it above the terrain to provide for a variable degree of clearancce between the underside of the trailer, regardless of the degree of roughness of the terrain.

8 Claims, 4 Drawing Sheets

TRACTOR-TRAILER CONNECTION FOR UNEVEN TERRAIN TRAVEL

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of land vehicles and more particularly tractor-tailer vehicles for travel over rough or uneven off road terrain.

It is desirable to provide a tractor-trailer, enabling the tractor to be connected to the trailer under misalignment conditions of pitch, roll and yaw, and additionally to permit such connection to be made even though the vertical reference between the two may vary substantially because of a grossly uneven surface upon which they rest. It is a further object of the invention to permit the trailer ground clearance to be selectively adjusted to compensate for very large degrees of roughness of the terrain being traversed.

SUMMARY OF A PREFERRED EMBODIMENT OF THE INVENTION

The above stated objects are accomplished by providing a first terminal portion of a gooseneck structure coupled to a tractor via a spherical bearing and a second terminal portion coupled to support brackets upon the trailer via a horizontal support beam positioned at the underside of the support brackets. Air bag lifting actuators cause the horizontal support beam to be raised to contact the support brackets mounted upon a side wall portion of the trailer and a hydraulic actuator thereafter causes a substantially vertical elevation control beam to press against a side wall portion of the trailer to elevate it above the terrain to provide for clearance between the underside of the trailer, regardless of the degree of roughness of the terrain.

BRIEF DESCRIPTION OF THE DRAWINGS

Other objects, features and advantages of the present invention will become apparent upon study of the following detailed description taken in conjunction with the drawings in which.

DETAILED DESCRIPTION OF A PREFERRED EMBODIMENT OF THE INVENTION

Figure 2:
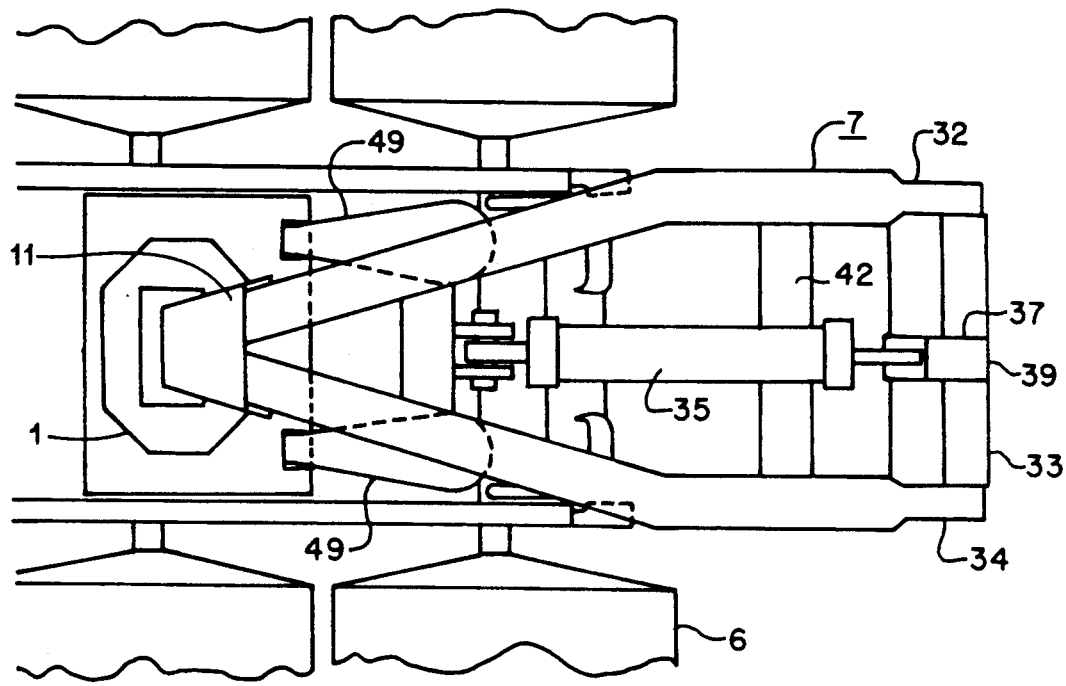
FIG. 2 illustrates a plan view of such components.
Figure 1:
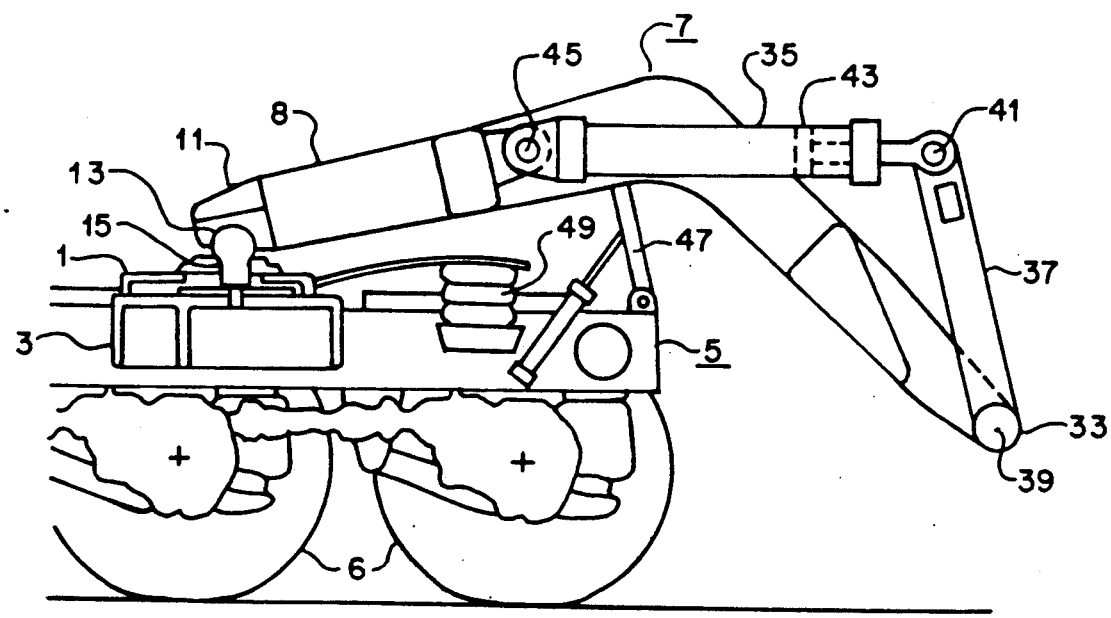
FIG. 1 illustrates a side view of major components of the tractor.

Referring now to FIGS. 1 and 2, tractor 1 is illustrated having a fifth wheel assembly 3 positioned thereon. A first terminal portion 11 of gooseneck structure 7 is illustrated, such terminal portion having a spherical bearing housing for containing a sphere 13 coupled to the fifth wheel assembly via a kingpin or sphere support member 15. These components make up a first coupling means for coupling the first left hand terminal portion of the gooseneck structure to the tractor. The spherical configuration enables relative rotation of the gooseneck structure 7 in pitch, roll, and yaw motions with respect to the tractor. The remaining components of the tractor, including tires 6, will be described hereinafter.

A second terminal portion of gooseneck structure 7 at 39 has a horizontal trailer support member or beam 33 coupled between box beams 32 and 34 of the gooseneck structure. A substantially vertically oriented elevation control member or beam 37 is pivotably coupled between terminal portion 39 and a right hand portion 41 of hydraulic actuator 35, as best shown in FIG. 1. The left hand portion of actuator 35 is pivotably coupled to a third portion of the gooseneck structure at 45. A tie-down device 47 is used to position the gooseneck structure in conjunction with air bags 49.

Figure 3:
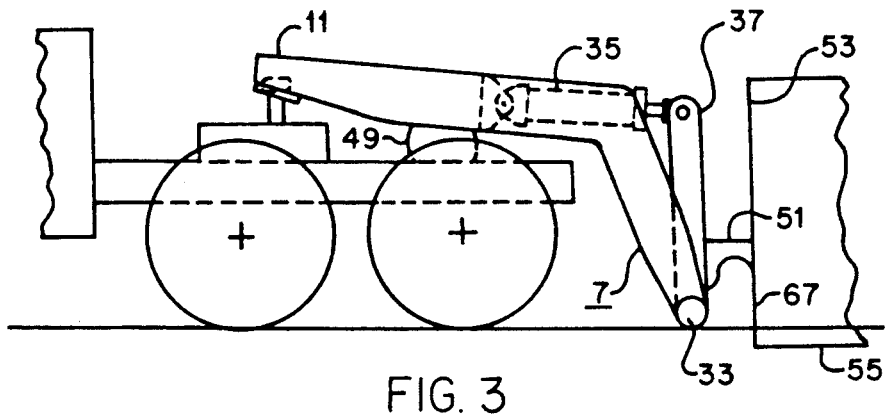
FIGS. 3-7 schematically illustrate the sequential positioning of the gooseneck components with respect to the trailer side wall during coupling of the tractor to the trailer.
Figure 4:
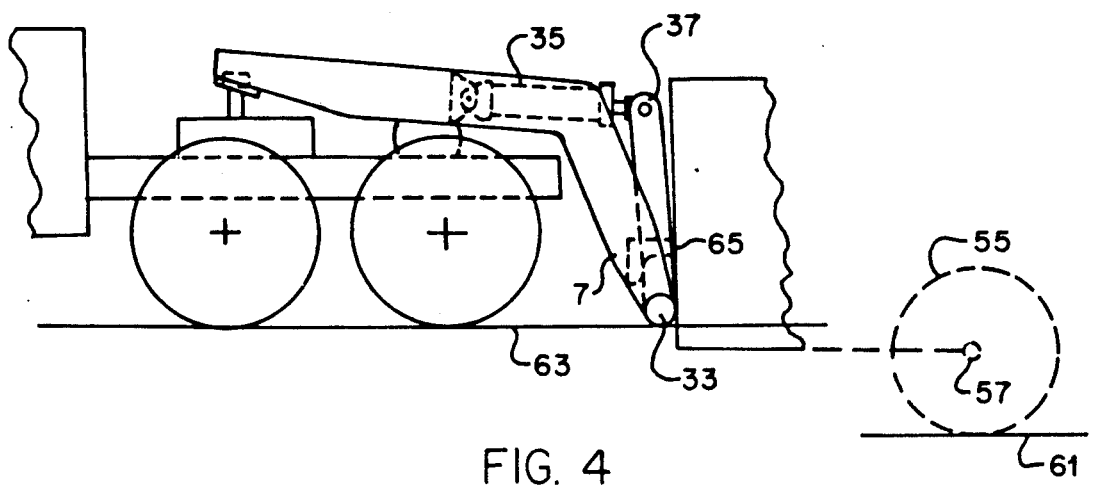

As indicated in FIG. 3, the coupling of the tractor to the trailer is commenced by inflating air bag 49 partially, and causing gooseneck structure 35 to be lowered by the retraction of the tie-down mechanism 47, of FIG. 2. The tractor is backed up and as indicated in FIG. 4, the horizontal support beam 33 sharply impacts the side wall 67 below a pair of widely separated support brackets or flanges 65, which in turn causes the kingpin 15 illustrated in FIGS. 1, 8 and 9 to be translated within the fifth wheel structure to neutralize minor misalignments and to enable the horizontal support beam 33 to be positioned flush with respect to the side wall 67 as shown in FIG. 4.

Figure 5:
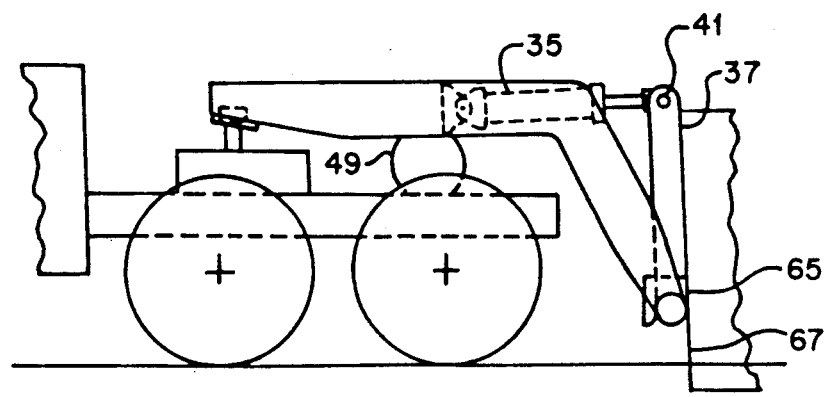
Figure 6:
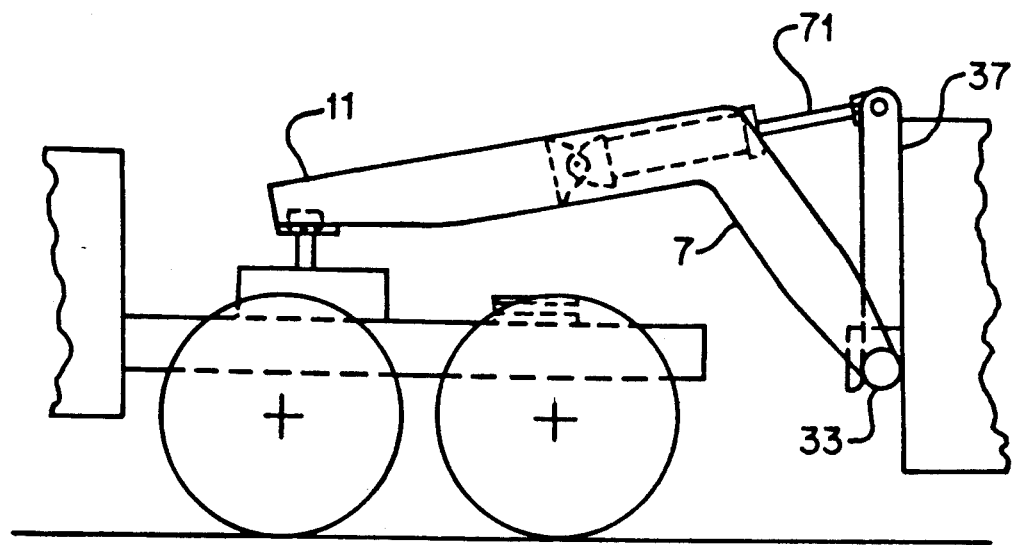
Figure 7:
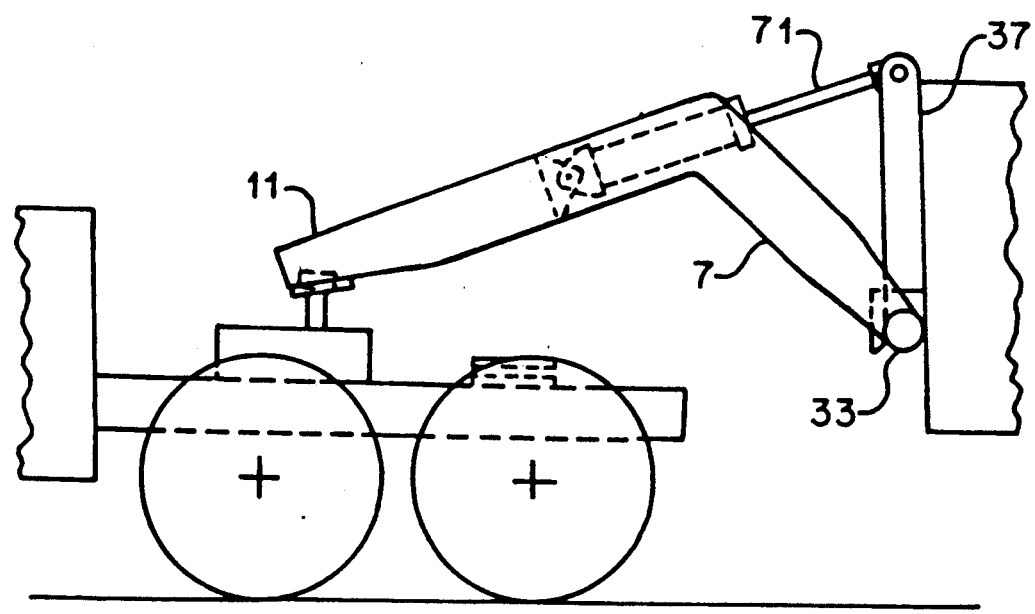

The next step in the coupling sequence involves raising the gooseneck by inflating air bags 49 until the horizontal support beam 33 fully engages the undersides of the support brackets 65, as shown in FIG. 5. Hydraulic actuator 35 thereafter causes the substantially vertical elevation control beam 37 to press against the side wall portion 67 of the trailer, which causes the body of the trailer to be raised above the ground as illustrated in FIGS. 6 and 7. The upper terminal portion of elevation control beam 37 is pivotably coupled to the plunger 71 of the hydraulic actuator to enable beam 37 to become further and further separated from the gooseneck structure as shown in FIGS. 5-7. The FIG. 4 axle 57 of trailer wheel 55 is schematically illustrated, and the centroid of all of the forces exerted by elevation control beam 37 against the side wall, produces a torque about axle 57 to cause the trailer to be pushed to the right and at the same time elevated. For very rough terrain, hydraulic actuator 35 would cause plunger 71 to extend a maximum distance as indicated in FIG. 7. If the terrain was less rough, the final position of the components would be as illustrated in FIG. 6 so that the trailer is not raised as high as indicated in FIG. 7.

Figure 8:
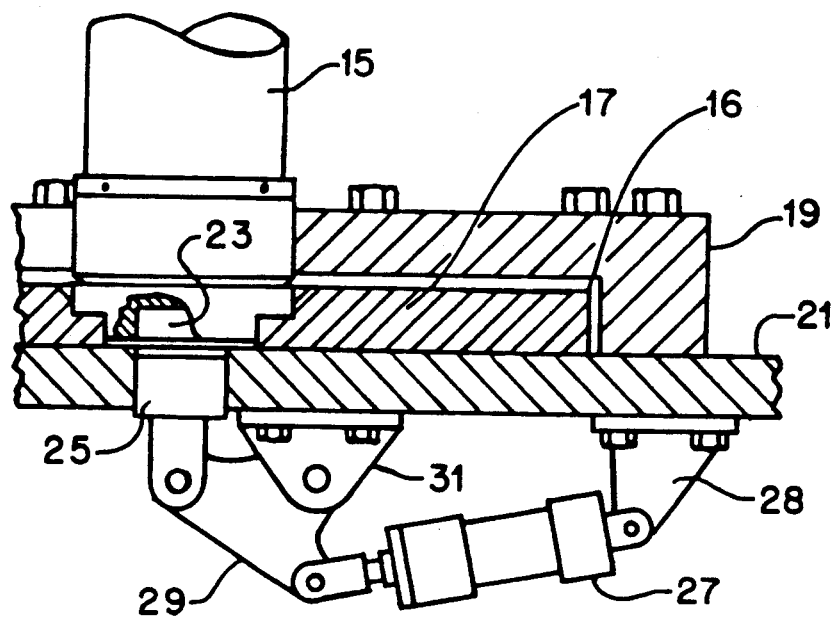
FIGS. 8 and 9 illustrate various details of the spherical coupler and the fifth wheel assembly.
Figure 9:
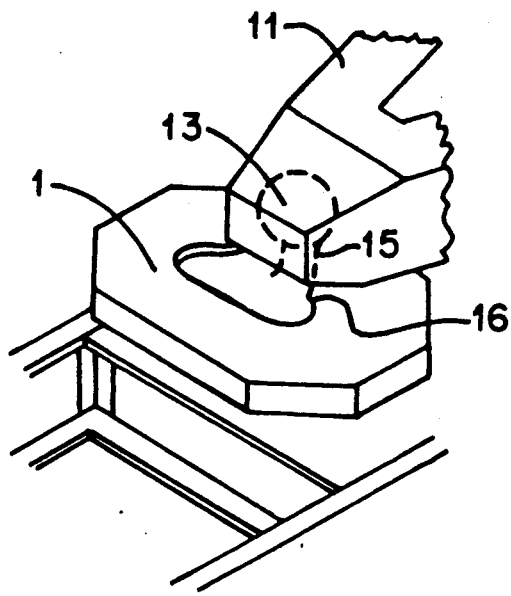

The air bags 49 are thereafter deflated, and the tractor is slowly driven to the left to translate the kingpin into the bottom portion 16 of the key slot, and the kingpin or sphere support member 15 (see FIG. 9) is thereafter locked in position during the normal travel mode of the tractor-trailer. This forward motion of the tractor to the left will cause floating plate 17 to be abutted at 16 against member 19 as indicated in FIG. 8. Kingpin 15 is thereafter locked by actuating a hydraulic actuator 27 positioned between bracket 28 and bell crank 29 to cause rotation of the bell crank and vertical displacement of lock pin 25 into cavity 23 of the floating plate which is rigidly coupled to kingpin 15. This action locks the gooseneck structure to the trailer. After kingpin 15 is locked, the final desired travel height of the trailer may be further adjusted. FIGS. 8 and 9 illustrate the spherical bearing housing 11 containing sphere 13 coupled in turn to floating plate 17 via kingpin support member 15.

The spherical bearing coupler enables relative rotation in the pitch, roll and yaw modes between the tractor and trailer so that the tractor-trailer is able to traverse extremely rough terrain. Additionally the selected, potentially large and variable degree of elevation of the trailer with respect to the tractor, as shown in FIGS. 6 and 7, also prevents damage to the underside portions of the trailer due to terrain roughness. The decoupling of the tractor from the trailer merely involves reversing the aforesaid steps described in connection with FIGS. 3–7. The terms tractor and trailer have been used for convenience and it should be apparent to the skilled worker in the art that the roles thereof may be reversed so that the trailer 55 may function as the tractor and the tractor to the left of 55 carrying the gooseneck structure can function as the trailer. It should also be apparent to the skilled worker that a series of trailers not having drive motors thereon may be coupled together by the aforesaid structure.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. Tractor-trailer coupler for coupling a tractor to a trailer comprising:
    first coupling means for coupling a first portion of a gooseneck structure to said tractor and for enabling motion of said gooseneck structure in pitch, roll and yaw modes with respect to said tractor;
    a horizontal trailer support member coupled to a second portion of said gooseneck structure widely separated from the first portion thereof;
    an elevation control member pivotably coupled between said horizontal trailer support member and a third portion of said gooseneck structure via a first actuator for pressing a side portion of the elevation control member against a wall portion of said trailer for in turn causing said trailer to rotate about a wheel axle thereof, thereby to elevate said trailer a predetermined distance from terrain over which said trailer travels; and
    wherein said first actuator is pivotably coupled to said elevation control member for enabling rotation thereof about said horizontal trailer support member; and
    further including a second actuator for elevating said horizontal trailer support member for enabling the mating of said horizontal trailer support member with support means affixed to said trailer before the operation of said first actuator for causing said trailer to rotate about an axle thereof and be lifted upwardly.

2. The coupler of claim 1 wherein said first coupling means comprises a sphere fitted within the first portion of said gooseneck structure and coupled to a fifth wheel assembly via a sphere support member slidable therein, and further including locking means for preventing relative motion between said sphere support member and said fifth wheel assembly.

3. The coupler of claim 2 wherein said second actuator includes at least one inflatable air bag.

4. The coupler of claim 1 wherein said second actuator includes at least one inflatable air bag.

5. Tractor-trailer coupler for coupling a tractor to a trailer comprising:
    first coupling means for coupling a first portion of a gooseneck structure to said tractor and for enabling motion of said gooseneck structure in pitch, roll and yaw modes with respect to said tractor;
    a horizontal trailer support member coupled to a second portion of said gooseneck structure widely separated from the first portion thereof;
    an elevation control member pivotably coupled between said horizontal trailer support member and a third portion of said gooseneck structure via a first actuator for pressing a side portion of the elevation control member against a wall portion of said trailer for in turn causing said trailer to rotate about a wheel axle thereof, thereby to elevate said trailer a predetermined distance from terrain over which said trailer travels; and
    wherein said first coupling means comprises a sphere fitted within the first portion of said gooseneck structure and coupled to a fifth wheel assembly via a sphere support member slidable therein, and further including locking means for preventing relative motion between said sphere support member and said fifth wheel assembly; and
    wherein said second actuator includes at least one inflatable air bag.

6. Tractor-trailer coupler for coupling a tractor to a trailer comprising:
    first coupling means for coupling a first portion of a gooseneck structure to said tractor and for enabling motion of said gooseneck structure in pitch, roll and yaw modes with respect to said tractor;
    a horizontal trailer support member coupled to a second portion of said gooseneck structure widely separated from the first portion thereof;
    an elevation control member pivotably coupled between said horizontal trailer support member and a third portion of said gooseneck structure via a first actuator for pressing a side portion of the elevation control member against a wall portion of said trailer for in turn causing said trailer to rotate about a wheel axle thereof, thereby to elevate said trailer a predetermined distance from terrain over which said trailer travels; and
    wherein said first actuator is pivotably coupled to said elevation control member for enabling rotation thereof about said horizontal trailer support member; and
    wherein said first coupling means comprises a sphere fitted within the first portion of said gooseneck structure and coupled to a fifth wheel assembly via a sphere support member slidable therein, and further including locking means for preventing relative motion between said sphere support member and said fifth wheel assembly; and
    wherein said second actuator includes at least one inflatable air bag.

7. Tractor-trailer coupler for coupling a tractor to a trailer comprising:
    first coupling means for coupling a first portion of a gooseneck structure to said tractor and for enabling motion of said gooseneck structure in pitch, roll and yaw modes with respect to said tractor;

a trailer support member coupled to a second portion of said gooseneck structure;

an elevation control member for pressing against a portion of said trailer for in turn causing said trailer to rotate about a wheel axle thereof, thereby to elevate said trailer a given distance from terrain over which said trailer travels, to prevent damage thereto, and including a first actuator pivotably coupled to said elevation control member for enabling rotation thereof about said trailer support member, and further including a second actuator for elevating said trailer support member for enabling the mating of said trailer support member with a support means affixed to said trailer before the operation of said first actuator for causing said trailer to rotate about said axle and be lifted upwardly.

8. The coupler of claim 7 wherein said first coupling means comprises a sphere fitted within the first portion of said gooseneck structure and coupled to a fifth wheel assembly via a sphere support member slidable therein, and further including locking means for preventing relative motion between said sphere support member and said fifth wheel assembly.

* * * * *